July 27, 1926.

G. C. THOMAS, JR 1,594,225

CABLE CONNECTER

Filed Jan. 22, 1924

Inventor
George C. Thomas, Jr.

By Attorneys

Patented July 27, 1926.

1,594,225

UNITED STATES PATENT OFFICE.

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY.

CABLE CONNECTER.

Application filed January 22, 1924. Serial No. 687,787.

This invention relates to electrical cable appliances, and more particularly to connecting devices for fastening electrical conduits, cables, or the like within the openings of electrical fixture boxes.

Electrical fixture boxes, such as cable and outlet boxes and the like now on the market, invariably employ standard round knockout openings for the reception of a cable end and anchoring device by which cable or conduit is anchored to the box; and the principal object of this invention is to produce a connecter of simple structure making for low cost in quantity production and which fits and attaches to standard boxes now on the market thereby avoiding any changes in present-day box construction.

Another aim of this invention is to provide a connecter which is simple and durable in construction, and a connecter which may readily and easily be engaged or disengaged from a conduit, cable, outlet box, or the like, and which firmly secures the conduit or cable thereto. A further object of this invention is to provide a connecter of the character described which is adapted for use with conduits or cables and conduit or cable openings of various sizes. Other objects will be in part obvious and in part pointed out hereinafter.

In accordance with my invention, the cable connecter comprises an annular member adapted to fit about a conduit or cable in the manner of a sleeve and received within a conduit or cable opening in a wall. Between the ends of the sleeve there is an arcuate co-axial slot, wide enough to receive the wall about the conduit opening and sufficiently long to allow the box wall to extend far enough into the slot to jam or clamp a conduit or cable in the sleeve. I provide means for forcing the connecter sidewise and pinching the conduit or cable against the entering wall edge to clamp the cable tightly between the wall edge and within the connecter. The connecter is held against axial displacement in consequence of the overlapping engagement of the anchorage portions of the connecter on each side of the slot against opposite sides of the entrant wall portion of the box. The connecter is forced radially of the conduit opening into such clamping position by means of a cam member or its equivalent which may be made a part of the connecter or the box and which in this improvement is usually and preferably mounted inside the box and the cam or other means effectively bears against an inside box wall.

In order that a clearer understanding of the invention may be had, attention is directed to the accompanying drawings forming a part of this application and illustrating certain possible embodiments of this invention.

Figure 1 is a sectional view of a connecter embodying my invention, showing a cable connected thereby in a conduit opening of an outlet box, the view being taken on the line 1—1 of Figure 2; and Figure 2 is an inside elevation of the assembly shown in Figure 1.

Figure 1:
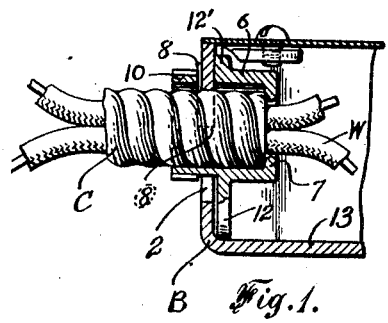

Referring to the drawings, B indicates an outlet box having a cable or conduit receiving hole or opening 2 which is usually covered by a knock-out disc until a cable is to be anchored therein. The connecter itself includes an annular sleeve 6 adapted to surround the cable armor C with the end of the armor abutting against a shouldered bushing 7 at the inner end of the connecter. The sleeve 6 has a transverse slot 8 into which the wall of the outlet box B is forced. A wrench head sleeve end 10 is positioned outside the box, while the shouldered end 7 remains inside of the box and acts as a seat against which the cable end rests as well as a bushing to protect the wires W from being abraded while an electrical connection is being made in the box. I provide means for forcing the connecter sleeve 6 radially of the box hole 2 so as to clamp and pinch the cable C against the eccentric edge of box wall and between the opposite inside portion of the sleeve connecter 6.

Figure 2:
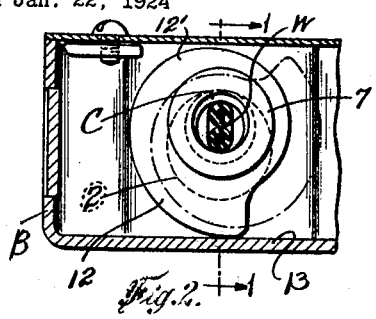
Figure 8:
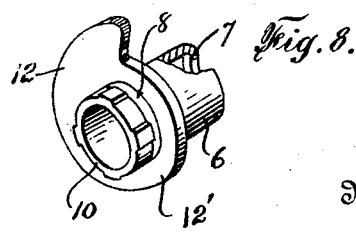
Figure 8 is a perspective view of the connecter in Figures 1 and 2 removed from the box.

As shown in Figures 1, 2 and 8, the radially forcing means may comprise a cam 12 formed integrally on, or attached to, the sleeve 6, and this cam is adapted to execute a camming action against an inside wall of the box. By forcibly rotating the cam 12 with respect to the box by turning the sleeve 6 with a tool or wrench, the sleeve may be forced into clamping position where it will be held by the engagement of cam 12 with the box wall, and it is observed how the sidewise or radial movement of the sleeve connecter is brought about by the rotation of the cam 12 inside the box which movement forcibly pinches the box edge into the cable C to simultaneously anchor the connecter and cable to the box. I preferably form a rim or flange 12' on the connecter sleeve opposite the cam 12 which acts to steady or brace the connecter by reason of enlarged bearing surface it has against the box wall.

Figure 6:
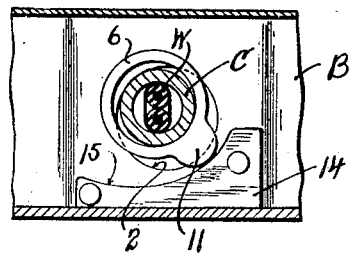
Figures 6 and 7 are each an inside view of an assembly including different modified forms of my invention.
Figure 7:
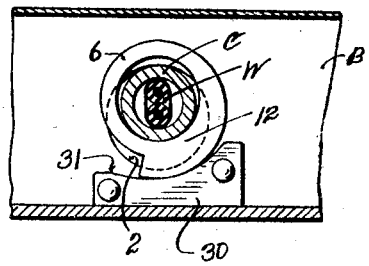

Instead of having the cam 12 coact with the box bottom, a cam plate may be riveted or otherwise secured to the wall of the box, as shown in Figures 6 and 7. The plate 14 is made with a cam edge 15 eccentric to the axis of the sleeve connecter and box hole 2 and is engaged by a raised bearing face or connecter moving projection or cam follower 11 integral with the connecter to force the connecter laterally and into positive clamping position.

As shown in Figure 7, a cam plate 30 is made a part of the box or is fastened thereto and possesses a working edge 31 which is in effect concentric to the axis of the connecter and box hole 2; and in this case the same cam 12, though likely smaller in size, works against the plate 30 to execute a camming action to forcibly move the connecter radially or sidewise thus bringing the box hole edge 2 into the sleeve slot and forcibly against the cable.

Figure 3:
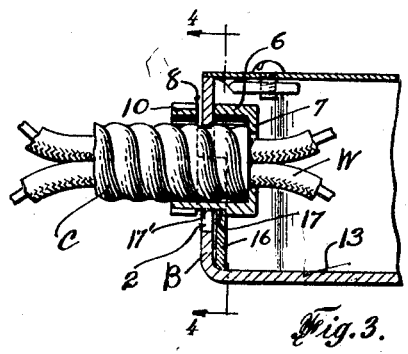
Figure 3 is a sectional assembly view of a modified form of the invention.
Figure 4:
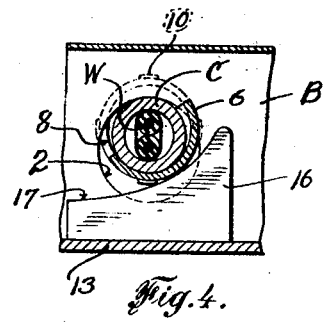
Figure 4 is an inside cross-sectional view taken on the line 4—4 of Figure 3.
Figure 5:
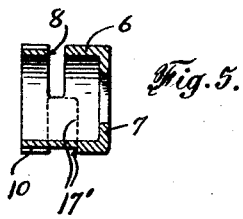
Figure 5 is a longitudinal sectional view of the connecter only shown in Figures 3 and 4.

Instead of providing a cam 12 on the sleeve 6, I may use a free cam plate or wedging key 16, attention being directed to Figures 3, 4 and 5, the bottom edge of which slidably rests against the box wall 13 and the upper edge of which provides a cam surface 17 which engages an abutment anchorage shoulder groove 17' made in the sleeve 6, so that by sliding or driving the cam plate or key 16 between the sleeve 6 and the box, the connecter is forced laterally or radially and held in clamping position with the box knock-out edge embraced in the sleeve slot 8 and pinched into the cable.

The manner of connecting or disconnecting a conduit, cable, or the like to or from an outlet box will be apparent from the above. In making the connection the sleeve 6 of any selected form is placed in the opening 2 with slot 8 aligned with the edge of the wall of the box, and the conduit or cable is placed in the sleeve 6. Then the sleeve is forced radially of opening 2 by rotating the cam until the conduit or cable is firmly clamped between the edge of box wall which enters the slot 8 and the opposite interior sleeve surface, such radial movement being accomplished either by turning the cam 12 relatively to the box bottom 13, as shown in Figure 1, or relatively to a cam plate as shown in Figure 7; or by driving the movable cam key or wedging plate 16 relatively to both sleeve 6 and box bottom 13, as shown in Figures 3 and 4.

When such movement has been effected the connecter is held against axial displacement from the box knock-out opening 2 by the sleeve groove slot 8 which overlaps and engages the opposite sides of the box wall B. To disengage a connected cable box, and connecter, the said connecter is rotated through a reverse movement to loosen up the sleeve 6 from the box opening 2 so the parts may be disassembled.

The slot 8 throughout the several forms of the invention, and the groove 17' in the sleeve of Figure 5, constitute anchorage means i. e. abutments which overlap both inside and outside surfaces of a box wall. The sleeve 6 being small enough to fit through the box hole contributes to its anchorage in the box because the box hole edge is left exposed or partly uncovered and positively seats between the shouldered groove 17' and down into the slot 8. In other words, the sleeve 6 fits through the box hole but covers only a part of the box hole edge. The sleeve includes an extension reaching through the box hole which connects the anchorage abutments; and a single operating means, as a cam or other device, operates inside the box to impart essential sidewise or lateral movement to the connecter thereby rendering effective the anchorage abutments into and between which seats the box hole edge and simultaneously grips the box hole edge into the cable.

The sleeve connecters may be cast and the key plates or cam plates may be stamped from sheet metal thereby rendering the producing of the devices economical.

As many changes could be made in the above construction and as many different embodiments of this invention could be made without departing from the scope thereof, it is intended that all matter contained in the above description or shown in the accompanying drawings be interpreted as illustrative and not in a limited sense.

What I claim is:

1. A box and cable connecting means comprising, a box having a hole, a member of such size as will fit into said hole, said member being provided with spaced means abutting the opposite box wall surfaces adjacent the hole to anchor the member in the box against longitudinal displacement and formed to expose a portion of the box hole edge to a cable placed therein, and said box and cable connecting means comprising a portion entirely within said box for moving said member laterally relative to the box thereby causing a cable in the box hole to be gripped between said member and exposed box hole edge.

2. A cable connecting means including a box having a hole to receive a connecter and a cable, a sleeve placed in the hole and having a transverse slot receiving the box hole edge, and means operating between said sleeve and an inside box wall for laterally moving said sleeve with respect to said box to cause a cable in the sleeve to be gripped between it and the box hole edge.

3. In combination with an electrical fixture box having a cable and connecter receiving hole, of a sleeve mounted inside the box with the sleeve end resting against the box wall and with a portion of the box hole edge projecting eccentrically inside the sleeve, a cam carried by the sleeve at right angles to the sleeve axis and bearing against an inside wall of the box, and tool receiving means on the connecter by which the cam is rotated against the inside box wall.

4. In combination with an electrical outlet box provided with a hole therein, of a connecter sleeve rotatably confined in the hole, said sleeve being provided with a box hole edge entry slot into which eccentrically projects a portion of the box hole edge, a cam integral with the sleeve disposed on the inside of the box working against an inside wall thereof, and tool receiving means made on the connecter outside the box by which the sleeve and cam are rotated.

5. A cable connecter adapted to anchor itself and simultaneously secure cable in a box hole comprising, a sleeve adapted to be rotatably confined in a box hole and surrounding a cable therein, said sleeve being provided with a transverse box hole edge entry slot into which an edge of a box hole is adapted to project, a cam integral with the sleeve parallel to the slot and adapted to be disposed on the inside of a box to cooperate with and engage an inside box wall, a flange made integral with the sleeve opposite the cam and adjacent the said slot, and a tool receiving means made on the connecter to rotate the cam inside and against a box wall.

6. A cable connecter adapted to anchor itself and simultaneously secure a cable in a box hole comprising, a cable sleeve adapted to be rotatably confined in a box hole and receive a cable therein, said sleeve being provided with a slot into which eccentrically projects a part of the box hole edge, a cam integral with the sleeve at right angles to the axis thereof adjacent and parallel to the slot and adapted to cover over a box hole edge and adapted to execute a camming action against a box wall inside a box, and a tool receiving means also adjacent the slot by which the cam is rotated inside a box.

7. A cable connecter comprising, a sleeve, a cam formed on one end thereof at right angles to the sleeve axis, a tool head spaced from the cam, said sleeve and tool head being connected by an integral member so as to define a box hole edge receiving slot between them, the operative portion of said cam being substantially diametrically opposite the receiving slot.

In testimony whereof I affix my signature.

GEORGE C. THOMAS, Jr.